US008731416B2

(12) United States Patent
Watahiki

(10) Patent No.: US 8,731,416 B2
(45) Date of Patent: May 20, 2014

(54) ELECTRONIC DEVICE, MALFUNCTION DETERMINING METHOD, AND COMPUTER PROGRAM PRODUCT

(75) Inventor: Tatsuya Watahiki, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 376 days.

(21) Appl. No.: 13/050,605

(22) Filed: Mar. 17, 2011

(65) Prior Publication Data

US 2011/0229164 A1 Sep. 22, 2011

(30) Foreign Application Priority Data

Mar. 18, 2010 (JP) .................................. 2010-063345
Feb. 23, 2011 (JP) .................................. 2011-037090

(51) Int. Cl.
G03G 15/00 (2006.01)

(52) U.S. Cl.
USPC .......................................................... 399/36

(58) Field of Classification Search
USPC .......................................................... 399/36
See application file for complete search history.

(56) References Cited

U.S. PATENT DOCUMENTS

| | | | | |
|---|---|---|---|---|
| 4,425,798 A | * | 1/1984 | Nagai et al. | 73/659 |
| 5,679,900 A | * | 10/1997 | Smulders | 73/659 |
| 5,732,306 A | * | 3/1998 | Wilczak, Jr. | 399/36 |
| 6,053,047 A | * | 4/2000 | Dister et al. | 73/593 |
| 7,561,830 B2 | | 7/2009 | Watahiki | |
| 2009/0140682 A1 | | 6/2009 | Watahiki | |
| 2010/0245945 A1 | * | 9/2010 | Murayama et al. | 358/498 |

FOREIGN PATENT DOCUMENTS

| | | |
|---|---|---|
| JP | 10-142876 | 5/1998 |
| JP | 2004-226482 | 8/2004 |
| JP | 2006-340423 | 12/2006 |
| JP | 2007-212719 | 8/2007 |
| JP | 2008-92315 | 4/2008 |
| JP | 2008-178276 | 7/2008 |

OTHER PUBLICATIONS

English Translation, Ishida JP2006340423, Dec. 2006.*

* cited by examiner

Primary Examiner — Ryan Walsh
(74) Attorney, Agent, or Firm — Oblon, Spivak, McClelland, Maier & Neustadt, L.L.P.

(57) ABSTRACT

An electronic device including a first motor, the electronic device including: a first movable body that is driven to move by the first motor; a detecting unit that detects a signal according to rotation of the first motor or movement of the first movable body; an analyzing unit that performs frequency analysis of the signal and generates an analysis result with respect to each frequency; and a determining unit that determines presence or absence of malfunction of the first motor or the first movable body based on an analysis result of a first frequency preset with respect to the first motor or the first movable body out of frequencies, and determines presence or absence of malfunction of a part other than the first motor and the first movable body on the basis of an analysis result of a second frequency preset with respect to the part out of the frequencies.

7 Claims, 8 Drawing Sheets

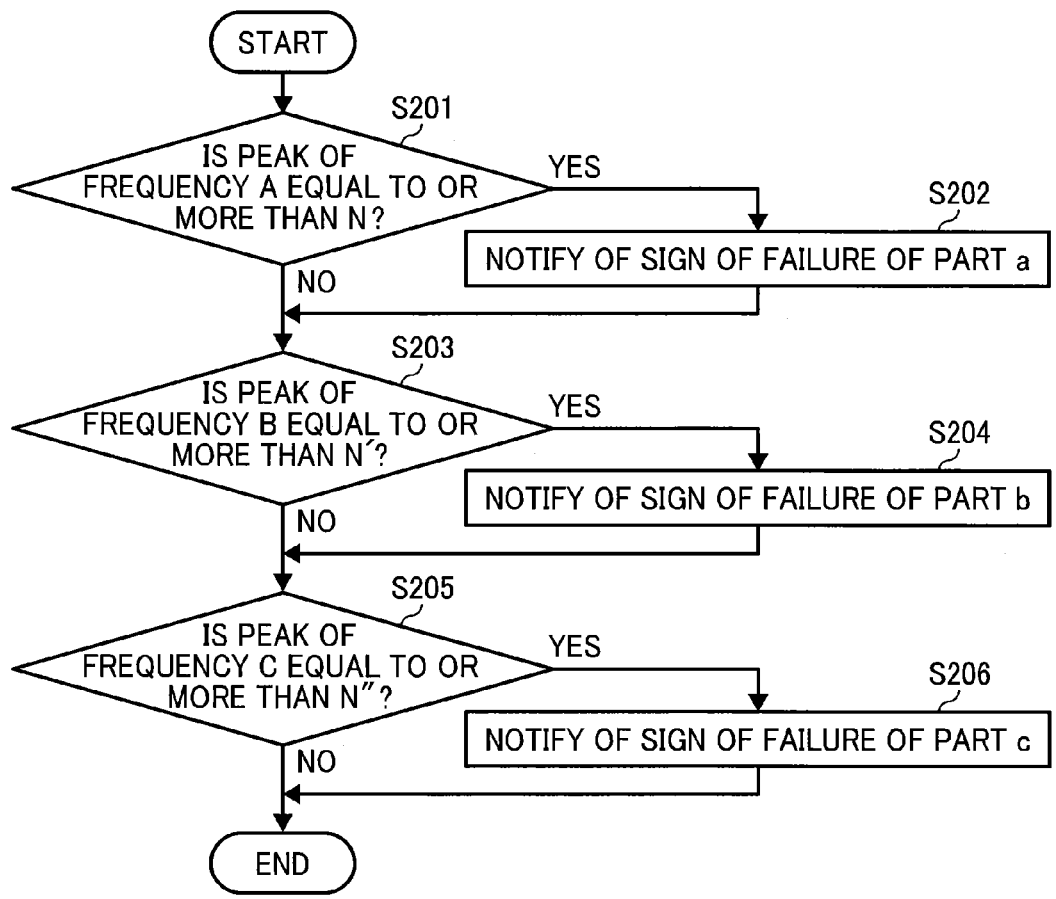

| FAILURE PART | FREQUENCY | THRESHOLD |
|---|---|---|
| a (DEVELOPING ROLLER) | A | D |
| b (PHOTOSENSITIVE-DRUM CLEANING ROLLER) | B | D′ |
| c (PHOTOSENSITIVE DRUM) | C | D″ |
| ······· | ······· | ······· |

ELECTRONIC DEVICE, MALFUNCTION DETERMINING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-063345 filed in Japan on Mar. 18, 2010 and Japanese Patent Application No. 2011-037090 filed in Japan on Feb. 23, 2011.

BACKGROUND OF THE INVENTION

1. Field of the Invention

The present invention relates to an electronic device, a malfunction determining method, and a computer program product.

2. Description of the Related Art

In recent years, an image forming apparatus has been required to form a high-quality image. Especially in the production market, a demand for prevention of image degradation is increasing, and output of a defect image must be avoided as far as possible.

Accordingly, there is an increasing need for prediction of failure occurrence by monitoring an abnormal condition of a device due to aging degradation or a mechanical malfunction. The prediction of failure occurrence makes it possible to take proactive step, such as repair by a serviceperson or internal automatic correction and degeneracy operation, before a defect image is output.

As one of approaches for the prediction of failure occurrence, there is known a technology to sample encoder data of a motor at regular intervals and perform frequency analysis of the data, thereby detecting a sign of failure and identifying a failure location. For example, in Japanese Patent Application Laid-open No. 2007-212719, to enable a failure diagnosis of a motor or a gear without adding a special failure detection circuit, a technology to make a failure diagnosis by comparison between a feature amount obtained by analyzing output of an encoder pulse and a reference feature amount has been proposed.

However, the conventional frequency analysis technology such as disclosed in Japanese Patent Application Laid-open No. 2007-212719 is for detecting occurrence of malfunction of a drive source to which an encoder sensor outputs or a drive system with one or a plurality of encoder sensors with respect to one drive source or drive system. Therefore, when there is a plurality of drive sources subject to detection of a sign of occurrence of malfunction or occurrence of failure, as many encoder sensors as the drive sources subject to detection are required. Therefore, a device configuration becomes complex, which causes an increase in cost. This leads to relinquishment of a malfunction detecting function.

SUMMARY OF THE INVENTION

It is an object of the present invention to at least partially solve the problems in the conventional technology.

According to an aspect of the present invention, there is provided an electronic device including a first motor, the electronic device including: a first movable body that is driven to move by the first motor; a detecting unit that detects a signal according to rotation of the first motor or movement of the first movable body; an analyzing unit that performs frequency analysis of the signal and generates an analysis result with respect to each frequency; and a determining unit that determines presence or absence of malfunction of the first motor or the first movable body on the basis of an analysis result of a first frequency preset with respect to the first motor or the first movable body out of frequencies, and determines presence or absence of malfunction of a part other than the first motor and the first movable body on the basis of an analysis result of a second frequency preset with respect to the part out of the frequencies.

According to another aspect of the present invention, there is provided a malfunction determining method executed by an electronic device including a first motor, a first movable body driven to move by the first motor, and a detecting unit for detecting a signal according to rotation of the first motor or movement of the first movable body, the malfunction determining method including: performing frequency analysis of the signal and generating an analysis result with respect to each frequency by an analyzing unit; and determining presence or absence of malfunction of the first motor or the first movable body on the basis of an analysis result of a first frequency preset with respect to the first motor or the first movable body out of frequencies and determining presence or absence of malfunction of a part other than the first motor and the first movable body on the basis of an analysis result of a second frequency preset with respect to the part out of the frequencies by a determining unit.

According to still another aspect of the present invention, there is provided a computer program product comprising a non-transitory computer-medium containing instructions that, when executed by a computer, cause the computer to perform malfunction determining method, the malfunction determining method including: performing frequency analysis of the signal and generating an analysis result with respect to each frequency by an analyzing unit; and determining presence or absence of malfunction of the first motor or the first movable body on the basis of an analysis result of a first frequency preset with respect to the first motor or the first movable body out of frequencies and determining presence or absence of malfunction of a part other than the first motor and the first movable body on the basis of an analysis result of a second frequency preset with respect to the part out of the frequencies by a determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart showing an example of a flow of an entire failure detecting process;

FIG. 10 is a diagram showing an example of a data structure of a table including a frequency and a threshold with respect to each failure part in an associated manner;

DETAILED DESCRIPTION OF THE PREFERRED EMBODIMENTS

Exemplary embodiments of an electronic device, a malfunction determining method, and a computer program product according to the present invention are explained in detail below with reference to the accompanying drawings.

Incidentally, in the description below, there is described an example where the electronic device according to the present invention is applied to an image forming apparatus which forms a color image; however, an applicable device is not limited to this. The present invention can be applied to any electronic devices including at least one motor. For example, the electronic devices include a printing device which receives image data from an external controller, such as a personal computer (PC), and forms an image. Furthermore, the present invention can be applied to any image forming apparatuses, such as a copier, a printer, a scanner device, a facsimile machine, and a multifunction peripheral (MFP) having at least two of a copy function, a printer function, a scanner function, and a facsimile function. Moreover, the present invention can be applied to a peripheral device connected to an image forming apparatus, such as a device for performing image formation preprocessing or image formation post-processing, a conveying device for conveying a sheet, etc. used in an image forming apparatus, and the like.

First Embodiment

An image forming apparatus according to a first embodiment holds information that a plurality of specific frequencies, which respectively vary when a plurality of drive sources are in failure, are associated with failure portions. Then, the image forming apparatus repeatedly performs malfunction determination in such a way that frequency analysis of an interval between pulses output from one encoder (pulse generating unit) corresponding to one drive source is performed and whether a plurality of specific frequencies out of analysis results each exceed a reference value is determined. By performing frequency analysis of an output pulse from an encoder attached to one drive source, states of other drive sources (drive systems) abuts on a drive system of the drive source can also be determined. That is, a malfunction detecting function can be achieved in a simpler configuration. Incidentally, the other drive systems need not directly abuts on the drive source to which the encoder is attached, and only need to have contact with the drive source to which the encoder is attached via an object such as another part. Or, the other drive systems only need to electrically or magnetically act on the drive source to which the encoder is attached.

Figure 1:
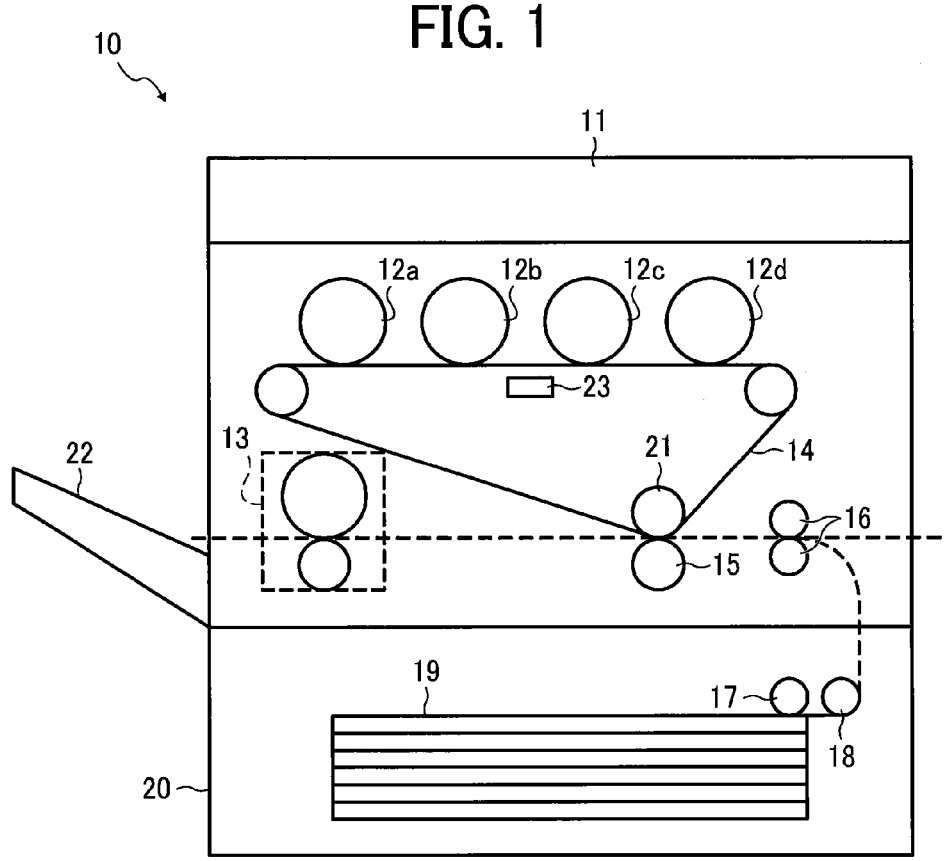
FIG. 1 is a block diagram showing a configuration of an image forming apparatus according to a first embodiment.

FIG. 1 is a block diagram showing a configuration of an image forming apparatus 10 according to the first embodiment. In the first embodiment, there is described an example of detecting malfunction of a part around a photosensitive drum used in a color copier. As shown in FIG. 1, the image forming apparatus 10 includes a scanner unit 11, photoconductor units 12a to 12d, a fixing unit 13, an intermediate transfer belt 14, a secondary transfer roller 15, a registration roller 16, a paper feed roller 17, a paper conveying roller 18, transfer paper 19, a feed unit 20, a repulsion roller 21, a copy receiving unit 22, and an intermediate transfer scale detecting sensor 23.

The scanner unit 11 scans an image of an original put on a top surface of an original table. The photoconductor units 12a to 12d for Y, C, M, and K colors, respectively, each have a drum-shaped photosensitive drum as a latent-image carrier, a photosensitive-drum cleaning roller, and the like. Hereinafter, the photoconductor units 12a to 12d may be referred to as just "photoconductor unit 12" when color is not specified.

The fixing unit 13 fixes a transferred toner image on transfer paper. YCMK toner images formed by the photoconductor units 12a to 12d are transferred onto the intermediate transfer belt 14 in a superimposed manner, and the superimposed four-color toner image on the intermediate transfer belt 14 is transferred onto transfer paper. The secondary transfer roller 15 transfers an image on the intermediate transfer belt 14 onto transfer paper. The registration roller 16 performs a skew correction of transfer paper, conveyance of the transfer paper, and the like. The paper feed roller 17 feeds transfer paper from the feed unit 20 to a conveying unit. The paper conveying roller 18 conveys a sheet of transfer paper 19 fed by the paper feed roller 17 to the registration roller 16.

The feed unit 20 contains a stack of transfer paper 19. The repulsion roller 21 is placed to be opposed to the secondary transfer roller 15, and forms and keeps a nip between the intermediate transfer belt 14 and the secondary transfer roller 15. Transfer paper on which a transferred image is fixed is discharged onto the copy receiving unit 22. The intermediate transfer scale detecting sensor 23 detects a scale formed on the intermediate transfer belt 14, and generates a pulse output.

Figure 2:
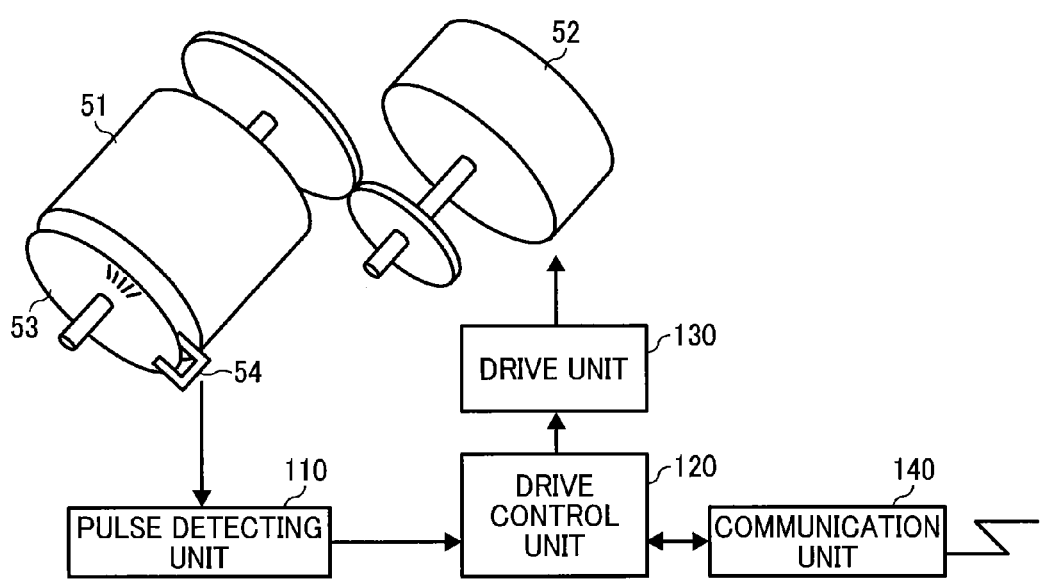
FIG. 2 is a block diagram showing an example of components for detecting malfunction of a part around a photoconductor unit.

FIG. 2 is a block diagram showing an example of components for detecting malfunction of a part around the photoconductor unit 12. As shown in FIG. 2, the photoconductor unit 12 includes a photosensitive drum 51, a motor 52, a code wheel 53, and a pulse generating unit 54. Furthermore, the image forming apparatus 10 includes a pulse detecting unit 110, a drive control unit 120, a drive unit 130, and a communication unit 140.

The motor 52 is a motor which is driven to rotate by the drive unit 130. The code wheel 53 is integrally attached to the photosensitive drum 51, and rotates one revolution along with one revolution of the photosensitive drum 51. The motor 52 is an example of a first motor, and the photosensitive drum 51 is an example of a first movable body. A rotary scale is formed on the outer circumference of the code wheel 53. For example, as the rotary scale, black slits can be formed on the transparent code wheel 53.

The pulse generating unit 54 detects the rotary scale formed on the code wheel 53, and functions as an encoder which outputs a pulse signal.

The pulse detecting unit 110 receives a pulse signal output from the pulse generating unit 54, and measures an interpulse time and takes it as data. The pulse detecting unit 110 is an example of a detecting unit, and detects a signal according to rotation of the photosensitive drum 51. The drive control unit 120 controls the speed of the motor 52 with reference to the interpulse time. For example, the drive control unit 120 compares the obtained interpulse time with a target interpulse time, and performs feedback control of the rotating speed of the motor 52 based on a result of the comparison. The drive unit 130 drives the motor 52 in response to a command from the drive control unit 120. The communication unit 140 transmits/receives data to/from the other components in the image forming apparatus 10 or an external device.

Incidentally, the method of control by the drive control unit 120 is not limited to a method to directly use a time such as an interpulse time; any means can be used as long as the means is a unit system which can detect a rotating state of the photosensitive drum 51. Furthermore, the feedback control is not particularly limited to control of the speed; alternatively, it can be control of the position or control of both the speed and the position. Moreover, depending on characteristics of the control system, feedforward control can be performed instead of the feedback control, or feedback control and feedforward control can be performed in combination.

Figure 3:
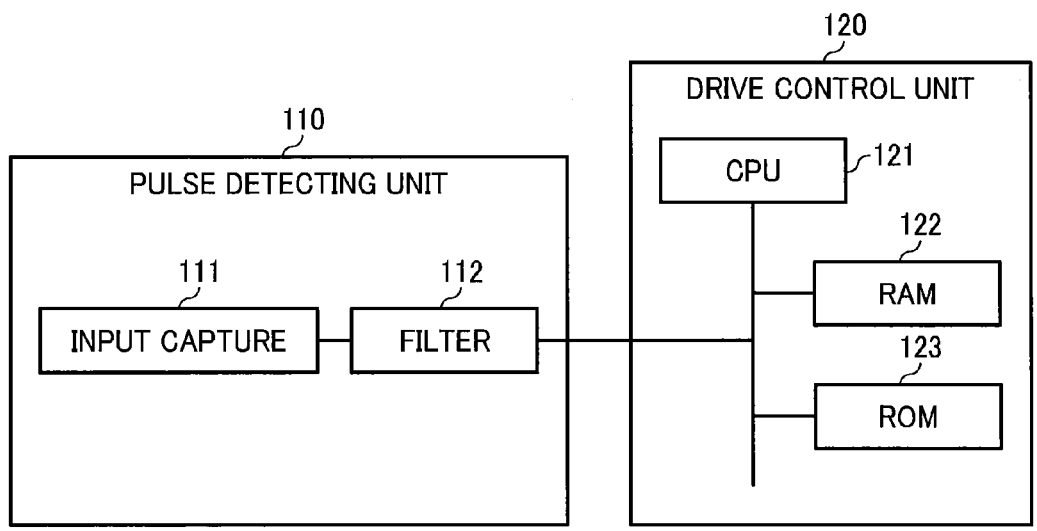
FIG. 3 is a block diagram showing an example of a detailed configuration of a pulse detecting unit and a drive control unit.

FIG. 3 is a block diagram showing an example of a more detailed configuration of the pulse detecting unit 110 and the drive control unit 120. As shown in FIG. 3, the pulse detecting unit 110 includes an input capture 111 and a filter 112.

The input capture 111 measures an interpulse time. The filter 112 performs removal and filtering, such as averaging, of improper data due to disturbance noise or the like.

The drive control unit 120 includes a CPU 121, a RAM 122, and a ROM 123. The CPU 121 performs arithmetic operation for motor control, and receiving and analysis of an instruction from outside. The RAM 122 is a temporary storage area for program or data processing. The ROM 123 is an area for storing a program or fixed data. The drive control unit 120 performs calculation using an interpulse time obtained from the pulse detecting unit 110 so that the photosensitive drum 51 can rotate at constant speed with high accuracy without rotating irregularly, and reflects a result of the calculation in the motor speed. Details of the motor speed control will be described later.

By using the configuration as shown in FIG. 2, frequency analysis of an interpulse time can be performed by a technique such as FFT (Fast Fourier Transform), and irregular rotation of a drive system of the photosensitive drum 51 can be detected. Incidentally, data subject to the FFT-based frequency analysis is not limited to the interpulse time, and any other data can be used as long as the data is a signal according to rotation of the motor 52 or rotation of the photosensitive drum 51 which is a movable body driven (to rotate) by the motor 52. Furthermore, the frequency analysis can be configured to calculate a peak value (a half amplitude value) or a peak-to-peak value (a double amplitude value).

Figure 4:
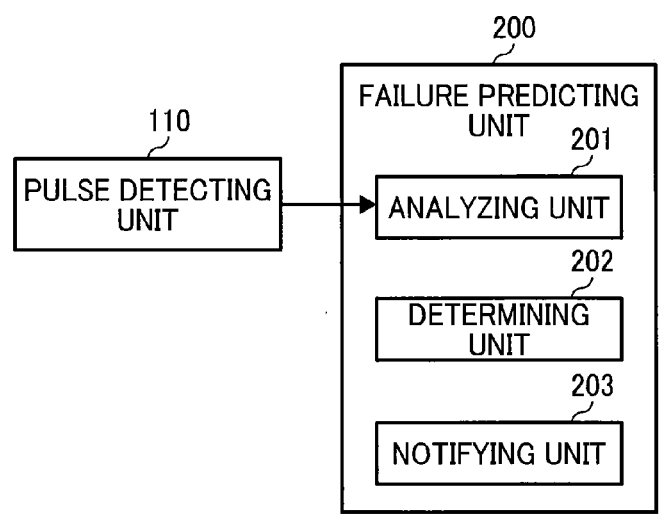
FIG. 4 is a block diagram showing an example of a configuration of a failure predicting unit which detects irregular rotation thereby predicting failure.

FIG. 4 is a block diagram showing an example of a configuration of a failure predicting unit 200 which detects irregular rotation thereby predicting failure. As shown in FIG. 4, the failure predicting unit 200 includes an analyzing unit 201, a determining unit 202, and a notifying unit 203.

The analyzing unit 201 receives a signal (an interpulse time) output from the pulse detecting unit 110, and performs frequency analysis of the interpulse time and generates an analysis result with respect to each frequency. In the present embodiment, the analyzing unit 201 analyzes an interpulse time by the FFT. Incidentally, an applicable analysis method is not limited to the FFT, and other analysis methods such as wavelet transform can be used.

The determining unit 202 determines presence or absence of malfunction of not only the photosensitive drum 51 to which the pulse generating unit 54 is attached but also other parts which affect the rotation of the photosensitive drum 51 from a result of analysis by the analyzing unit 201. Details of a determining process performed by the determining unit 202 will be described later.

The notifying unit 203 notifies of a result of the malfunction determination by the determining unit 202. For example, the notifying unit 203 output information about occurrence of malfunction to a display device such as a display. Furthermore, the notifying unit 203 can be configured to transmit the information about occurrence of malfunction to a predetermined external device via the communication unit 140, so that an operator, a support, and a service, etc. can take actions, such as repair, depending on the situation.

The failure predicting unit 200 can be realized, for example, by the CPU 121 in the drive control unit 120. Namely, it can be configured that the CPU 121 loads a program composed of modules including the units of the failure predicting unit 200 (the analyzing unit 201, the determining unit 202, and the notifying unit 203) on the RAM 122 and generates these units on the RAM 122.

In recent years, an inexpensive high-end CPU can be selected, so FFT calculation or the like can be performed during an unoccupied time so as not to affect the motor control performance. Namely, the image forming apparatus 10 alone can detect irregular rotation of a motor drive system driven inside the apparatus, i.e., occurrence of an abnormal condition without using an external dedicated device or the like. Specifically, by monitoring a temporal change of the irregular rotation, occurrence of an abnormal condition of the apparatus due to degradation of a mechanical system, such as gear wear, or an unusual load can be detected. Consequently, the image forming apparatus 10 alone can predict occurrence of its own failure.

Figure 5:
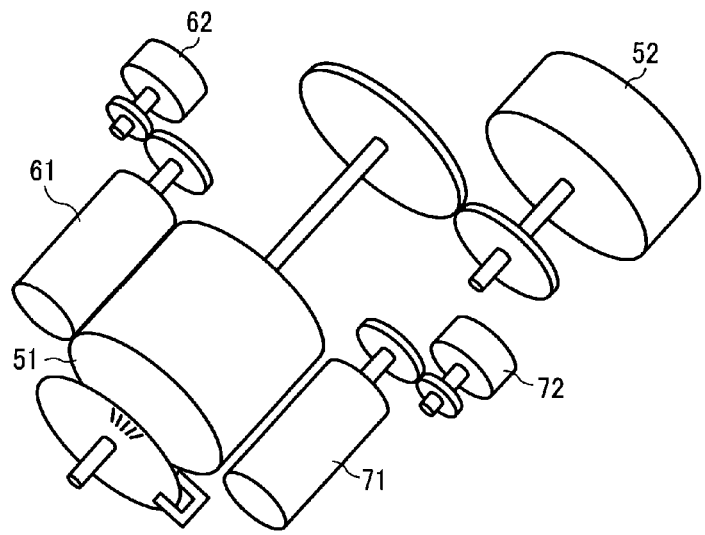
FIG. 5 is a diagram showing an example of a configuration of parts around the photoconductor unit.

Subsequently, details of the determining process performed by the determining unit 202 are explained. First, a concrete example of a configuration of parts around the photoconductor unit 12 is explained. FIG. 5 is a diagram showing an example of a configuration of parts around the photoconductor unit 12.

As shown in FIG. 5, around the photoconductor unit 12, the photosensitive drum 51 and the motor 52 as well as a photosensitive-drum cleaning roller 61, a motor 62 for driving the photosensitive-drum cleaning roller 61, a developing roller 71, and a motor 72 for driving the developing roller 71 are arranged.

The developing roller 71 driven by the motor 72 transfers toner to an electrostatic latent image formed on the photosensitive drum 51. The photosensitive-drum cleaning roller 61 driven by the motor 62 removes residual toner remaining on the photosensitive drum 51 after transfer of a toner image.

Here, the developing roller 71 and the photosensitive-drum cleaning roller 61, which are main elements for image formation, are arranged to be in contact with or very close to the photosensitive drum 51 in view of the respective functions. For example, the developing roller 71 transfers toner using a potential difference from the photosensitive drum 51. Therefore, although the developing roller 71 is not in (abutting) contact with the photosensitive drum 51, the developing roller 71 electrically or magnetically acts on the photosensitive drum 51.

The developing roller 71 and the photosensitive-drum cleaning roller 61 are both controlled by respective separate drive motors (the motor 72 and the motor 62). The motor 72, the motor 62, gear installation eccentricity, diameter deviation of the developing roller 71, and diameter deviation of the photosensitive-drum cleaning roller 61, etc. are considered to affect the surface speed of the photosensitive drum 51.

Of course, to avoid affecting the photosensitive drum 51 which needs to be controlled with high accuracy, the developing roller 71 and the photosensitive-drum cleaning roller 61 are both designed and assembled with high accuracy.

However, due to temporal degradation, such as gear wear, or an unusual load increase caused by entry of a foreign substance or the like, etc., irregular rotation of a developing-roller drive system or a photosensitive-drum-cleaning-roller drive system occurs, and this affects the surface speed of the photosensitive drum 51, and as a result, a defect image or shutdown of the apparatus due to machinery failure may happen.

Here, when malfunction of the developing-roller drive system and the photosensitive-drum-cleaning-roller drive system occurs, the malfunction shows up as a defect image, which means their abnormal conditions are considered to reach the photosensitive drum 51.

Therefore, to achieve a high-quality image, a photosensitive-drum drive system includes the code wheel 53 and the pulse generating unit 54, thereby the photosensitive-drum drive system further has a function of analyzing a signal from the developing-roller drive system or the photosensitive-drum-cleaning-roller drive system based on output from the pulse generating unit 54, so it is possible to grasp states of the developing-roller drive system and the photosensitive-drum-cleaning-roller drive system.

Subsequently, a concept of how malfunction is detected in the event of malfunction of the respective drive systems is explained with reference to FIG. 6. Waveforms in FIG. 6 show rotational states of the developing roller 71, the photosensitive-drum cleaning roller 61, and the photosensitive drum 51, respectively, from the top.

Figure 6:
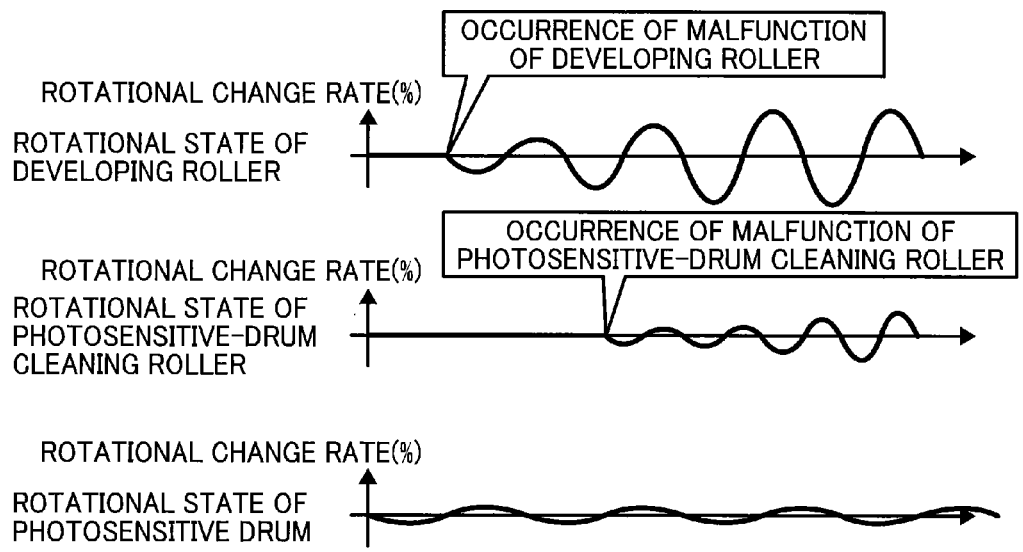
FIG. 6 is a diagram for explaining a concept of how malfunction is detected in the event of malfunction of a drive system.

FIG. 6 shows an example where a rotational change in a frequency as a rotational component of the photosensitive drum 51 (hereinafter, referred to as "C[Hz]") exists by default. The developing roller 71 and the photosensitive-drum cleaning roller 61 are initially in a state where no rotational component exists.

It is assumed that from the point of occurrence of malfunction of the developing roller 71, a rotational change in A[Hz] as a rotational component of the developing roller 71 begins to occur, and from the point of occurrence of malfunction of the photosensitive-drum cleaning roller 61, a rotational change in B[Hz] as a rotational component of the photosensitive-drum cleaning roller 61 begins to occur.

A change component that the above three rotational changes are superimposed is output from the code wheel 53 attached to the shaft of the photosensitive drum 51 and the pulse generating unit 54.

Figure 7:
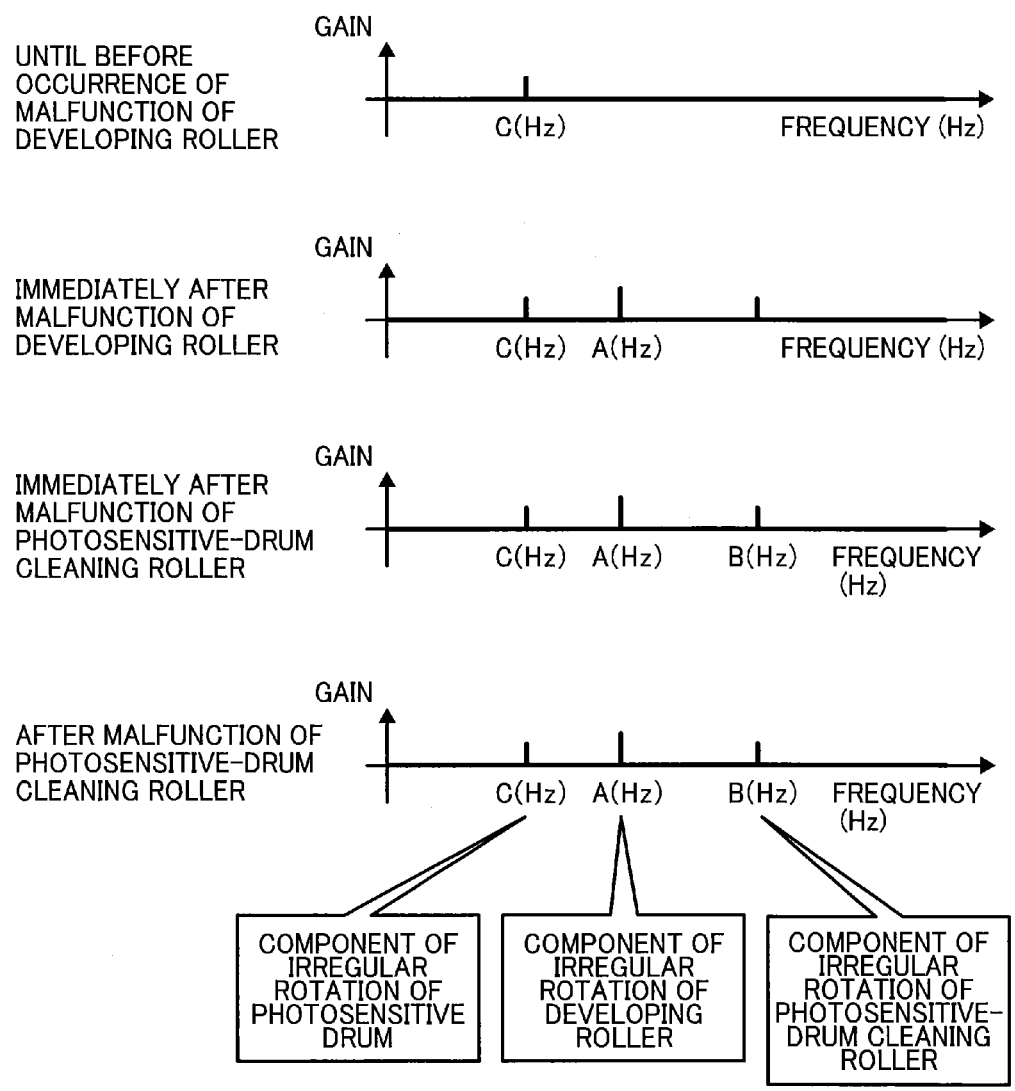
FIG. 7 is a diagram showing results of frequency analyses of interpulse time.

FIG. 7 is a diagram showing results of frequency analyses of interpulse time output from the pulse detecting unit 110 performed at different timing.

Until before occurrence of malfunction of the developing roller 71, only a component of rotational change of the photosensitive drum 51 exists. Therefore, the frequency analysis result shows that a peak is detected in C[Hz] which is a frequency corresponding to the rotational change component.

After that, when malfunction occurs in the developing roller 71, the malfunction affects the photosensitive drum 51. Therefore, when frequency analysis of an interpulse time is performed, a peak is detected in A[Hz] from a variable frequency and a change rate due to the malfunction of the developing roller 71. Similarly, when frequency analysis is performed immediately after occurrence of malfunction of the photosensitive-drum cleaning roller 61, a peak is detected in B[Hz] which is a variable frequency due to the malfunction of the photosensitive-drum cleaning roller 61.

Furthermore, if the malfunction of the developing roller 71 is advanced at this time, a peak value of the previously-detected A[Hz] shows up as a larger value. After that, when the malfunction of the developing roller 71 and the photosensitive-drum cleaning roller 61 are advanced with time, it is detected that a peak in the position of the similarly-detected frequency grows progressively larger.

By observing changes in these peak values, occurrence of failure of the developing-roller drive system and the photosensitive-drum-cleaning-roller drive system can be predicted.

Incidentally, the parts subject to malfunction detection shown in FIGS. 6 and 7 are an example, and the other parts can be an object of malfunction detection. For example, the motor 52 can be an object of malfunction detection instead of the photosensitive drum 51 which is a rotating body (a movable body) driven by the motor 52, or both the photosensitive drum 51 and the motor 52 can be an object of malfunction detection.

Figure 8:
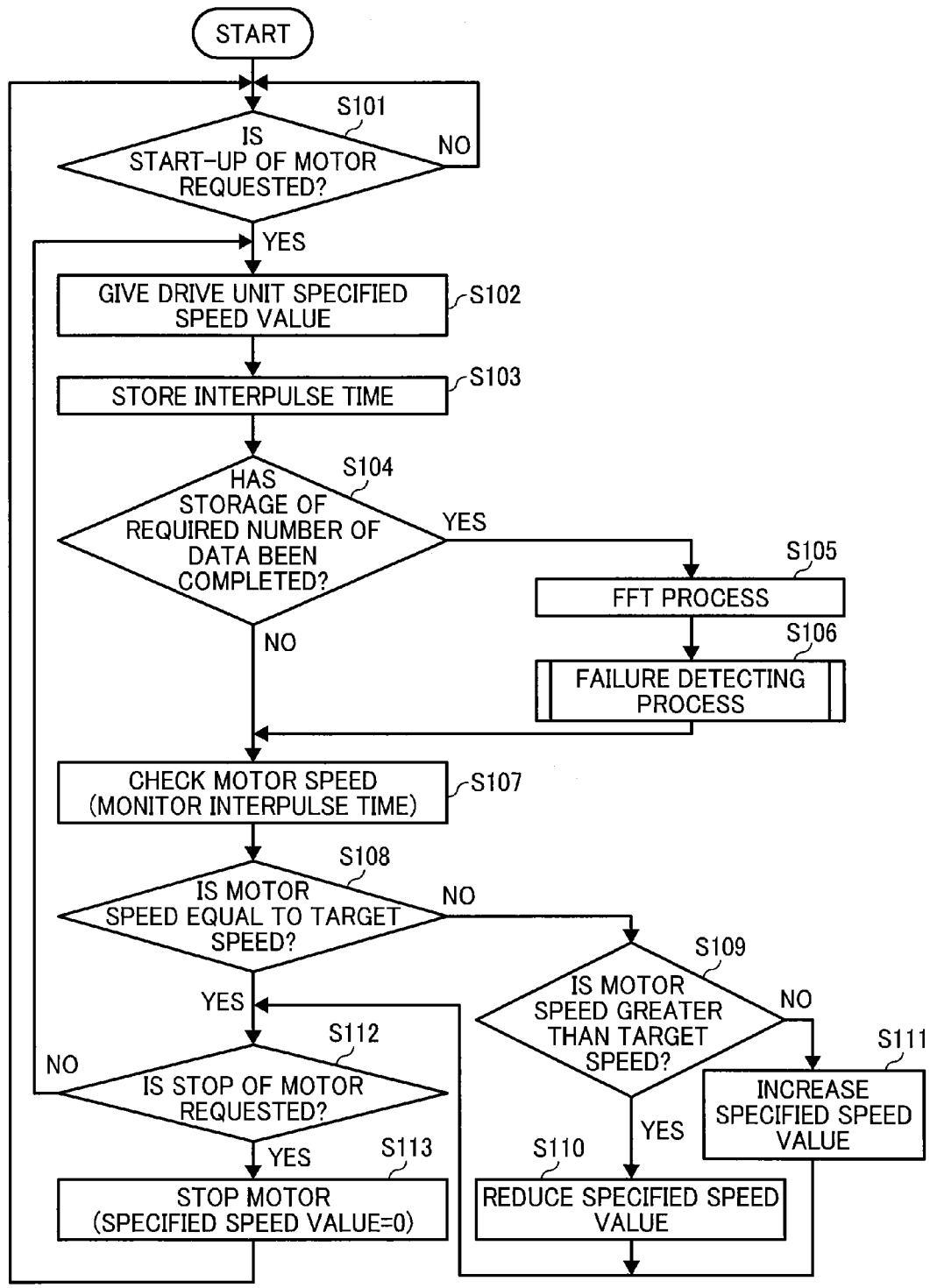
FIG. 8 is a flowchart showing an example of a flow of an entire motor control/malfunction detecting process.

Subsequently, a motor control/malfunction detecting process performed by the image forming apparatus 10 according to the first embodiment is explained with reference to FIG. 8. The motor control/malfunction detecting process means motor control and a process of detecting malfunction of a part using a signal (an interpulse time) used in control of the motor speed. FIG. 8 is a flowchart showing an example of a flow of the entire motor control/malfunction detecting process.

First, the drive control unit 120 determines whether start-up of the motor 52 is requested (Step S101). If it is not requested (NO at Step S101), the process at Step S101 is repeatedly performed until start-up of the motor 52 is requested. When start-up of the motor 52 is requested (YES at Step S101), the drive control unit 120 gives the drive unit 130 a specified value of the rotating speed of the motor 52 (Step S102). This leads the drive control unit 120 to start controlling the speed of the motor 52. Furthermore, in accordance with rotation of the motor 52, a pulse signal is output from the pulse generating unit 54, and an interpulse time is output from the pulse detecting unit 110.

The drive control unit 120 stores the output interpulse time in the RAM 122 or the like (Step S103). On the other hand, the analyzing unit 201 of the failure predicting unit 200 determines whether storage of the number of data about the interpulse time required for frequency analysis has been completed (Step S104). A certain amount of data sampled at regular intervals is required to perform frequency analysis, such as FFT, so frequency analysis is performed after data required for calculation is obtained.

Namely, when determining that the storage has been completed (YES at Step S104), the analyzing unit 201 performs a frequency analysis process of the interpulse time (Step S105). Then, the determining unit 202 performs a failure detecting process for detecting failure of a part from a result of the frequency analysis (Step S106). Details of the failure detecting process will be described later.

After the failure detecting process or when it is determined at Step S104 that the required number of data about the interpulse time has not been stored (NO at Step S104), the drive control unit 120 monitors the interpulse time and checks the rotating speed of the motor 52 (Step S107). The drive control unit 120 determines whether the rotating speed of the motor 52 is in agreement with a target speed (Step S108). If the rotating speed of the motor 52 is not in agreement with the target speed (NO at Step S108), the drive control unit 120 determines whether the rotating speed of the motor 52 is greater than the target speed (Step S109). When the rotating speed of the motor 52 is greater than the target speed (YES at Step S109), the drive control unit 120 reduces the specified speed value (Step S110). When the rotating speed of the motor 52 is not greater than the target speed (NO at Step S109), the drive control unit 120 increases the specified speed value (Step S111).

When it is determined at Step S108 that the rotating speed of the motor 52 is in agreement with the target speed (YES at Step S108) or after the specified speed value is changed either at Step S110 or at Step S111, the drive control unit 120 determines whether stop of the motor is requested (Step S112). If stop of the motor is not requested (NO at Step S112), rotation of the motor 52 at the current specified speed value is continued (Step S102).

When stop of the motor is requested (YES at Step S112), the drive control unit 120 sets the specified speed value to zero, thereby stopping rotation of the motor 52 (Step S113). After that, return to Step S101, the drive control unit 120 repeatedly performs the process.

Subsequently, an example of the failure detecting process at Step S106 is explained with reference to FIG. 9. FIG. 9 is a flowchart showing an example of a flow of the entire failure detecting process.

First, the determining unit 202 determines whether a peak value of a frequency A, which is set with respect to a part a out of a failure area subject to failure determination, is equal to or more than a corresponding predetermined threshold N (Step S201).

Incidentally, a part subject to determination, a frequency corresponding to the part, and a threshold used in the determination are determined, for example, with reference to a table as shown in FIG. 10. FIG. 10 is a diagram showing an example of a data structure of a table including a frequency and a threshold with respect to each failure part in an associated manner. As shown in FIG. 10, this table stores a failure part, a frequency used in failure determination out of frequency analysis results, and a threshold used in determination of a sign of failure in an associated manner.

Incidentally, as shown in FIG. 10, in what follows, there is described that parts a, b, and c denote the developing roller 71, the photosensitive-drum cleaning roller 61, and the photosensitive drum 51, respectively. Furthermore, frequencies corresponding to the parts a, b, and c are denoted by A, B, and C, respectively, in the same manner as in FIG. 7. Moreover, thresholds corresponding to the parts a, b, and c are denoted by N, N', and N", respectively.

To return to FIG. 9, when the peak value of the frequency A is equal to or more than the threshold N (YES at Step S201), the determining unit 202 determines that there is a sign of occurrence of failure of the part a (the developing roller 71). In this case, the notifying unit 203 notifies of the sign of failure (Step S202). After that, the determining unit 202 determines whether a peak value of a frequency B is equal to or more than a threshold N' (Step S203).

Furthermore, when the peak value of the frequency A is less than the threshold N (NO at Step S201), the determining unit 202 further determines whether a peak value of a frequency B is equal to or more than a threshold N' (Step S203). When the peak value of the frequency B is equal to or more than the threshold N' (YES at Step S203), the determining unit 202 determines that there is a sign of occurrence of failure of the part b (the photosensitive-drum cleaning roller 61). In this case, the notifying unit 203 notifies of the sign of failure (Step S204). After that, the determining unit 202 determines whether a peak value of a frequency C is equal to or more than a threshold N" (Step S205).

Furthermore, when the peak value of the frequency B is less than the threshold N' (NO at Step S203), the determining unit 202 further determines whether a peak value of a frequency C is equal to or more than a threshold N" (Step S205). When the peak value of the frequency C is equal to or more than the threshold N" (YES at Step S205), the determining unit 202 determines that there is a sign of occurrence of failure of the part c (the photosensitive drum 51). In this case, the notifying unit 203 notifies of the sign of failure (Step S206), and the failure detecting process is terminated. When the peak value of the frequency C is less than the threshold N" (NO at Step S205), the failure detecting process is terminated.

Incidentally, FIG. 9 shows an example where a sign of failure occurrence is determined by comparing an absolute value of a peak value of a frequency analysis result with a threshold; however, a determination method is not limited to this. For example, failure occurrence can be determined from a result of comparison between a rate of change of a peak value and a threshold. Furthermore, different determination methods from one part to be determined to another can be used.

Figures 11, 12:
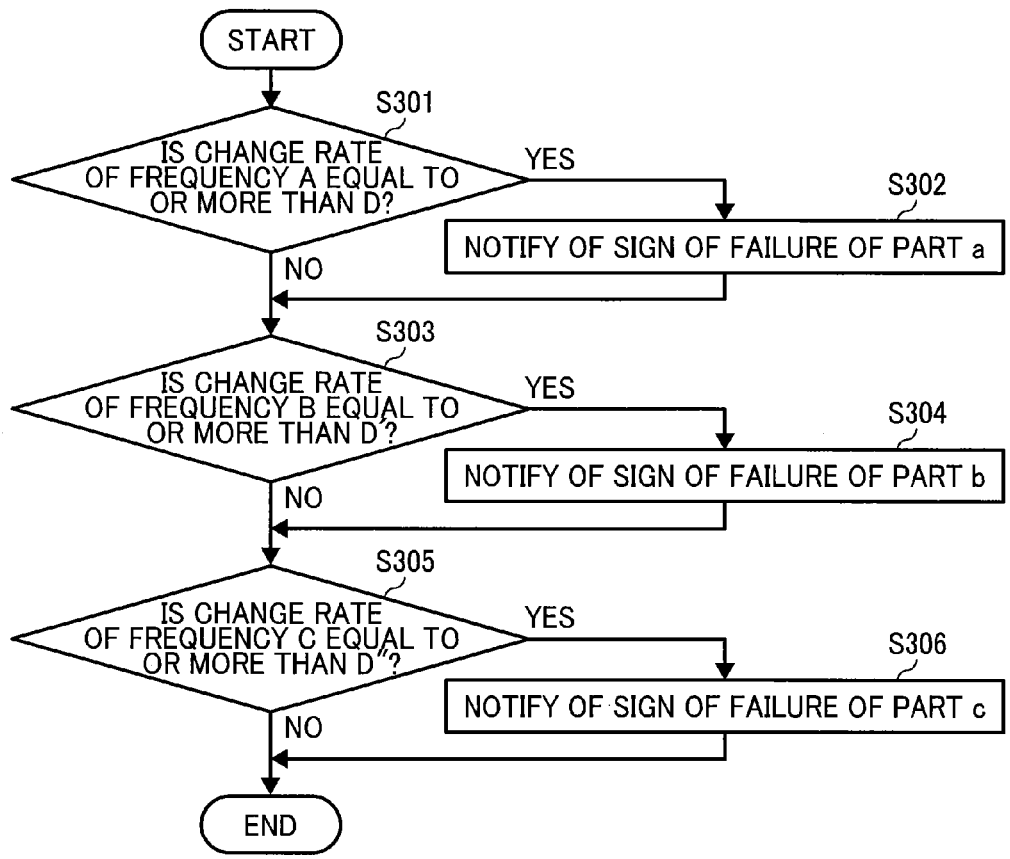
FIG. 11 is a flowchart showing another example of the flow of the entire failure detecting process.
FIG. 12 is a diagram showing an example of a data structure of a table including a frequency and a threshold with respect to each failure part in an associated manner.

Subsequently, a failure detecting process in the case of determining failure occurrence from a result of comparison between a rate of change of a peak value and a threshold is explained with reference to FIGS. 11 and 12. FIG. 11 is a flowchart showing another example of the flow of the entire failure detecting process. FIG. 12 is a diagram showing an example of a data structure of a table including a frequency and a threshold, which are used in this case, with respect to each failure part in an associated manner.

As shown in FIGS. 11 and 12, this example is different from the example of FIGS. 9 and 10 in that failure occurrence is determined by comparing a rate of change of a peak value instead of a peak value of a frequency with a predetermined change-rate threshold (D, D', D"). The other steps of the flow of the entire failure detecting process in FIG. 11 (Steps S301 to S306) are identical to Steps S201 to S206 in FIG. 9, so the description of these steps is omitted. Incidentally, the determining unit 202 calculates, for example, a change rate with respect to a predetermined peak value as a default rotational change, and compares the change rate with the threshold.

In this manner, according to the first embodiment, without installing a malfunction detector (a code wheel and a pulse generating unit) to each of a plurality of drive systems, prediction of occurrence of failure of the drive systems can be performed by using a detector of a drive system which abuts on the drive systems or has contact with the drive systems via another object or a drive system which electrically or magnetically acts on the drive systems.

Second Embodiment

In the first embodiment, there is described detection of states of the developing roller 71 and the photosensitive-drum cleaning roller 61 that have direct contact with the photosensitive drum 51 which is a rotating body to which the code wheel 53 is attached.

In a second embodiment, there is described an example where a state of the secondary transfer roller 15 is detected with a code wheel installed to a drive motor mechanism of the intermediate transfer belt 14 via the intermediate transfer belt 14.

Figure 13:
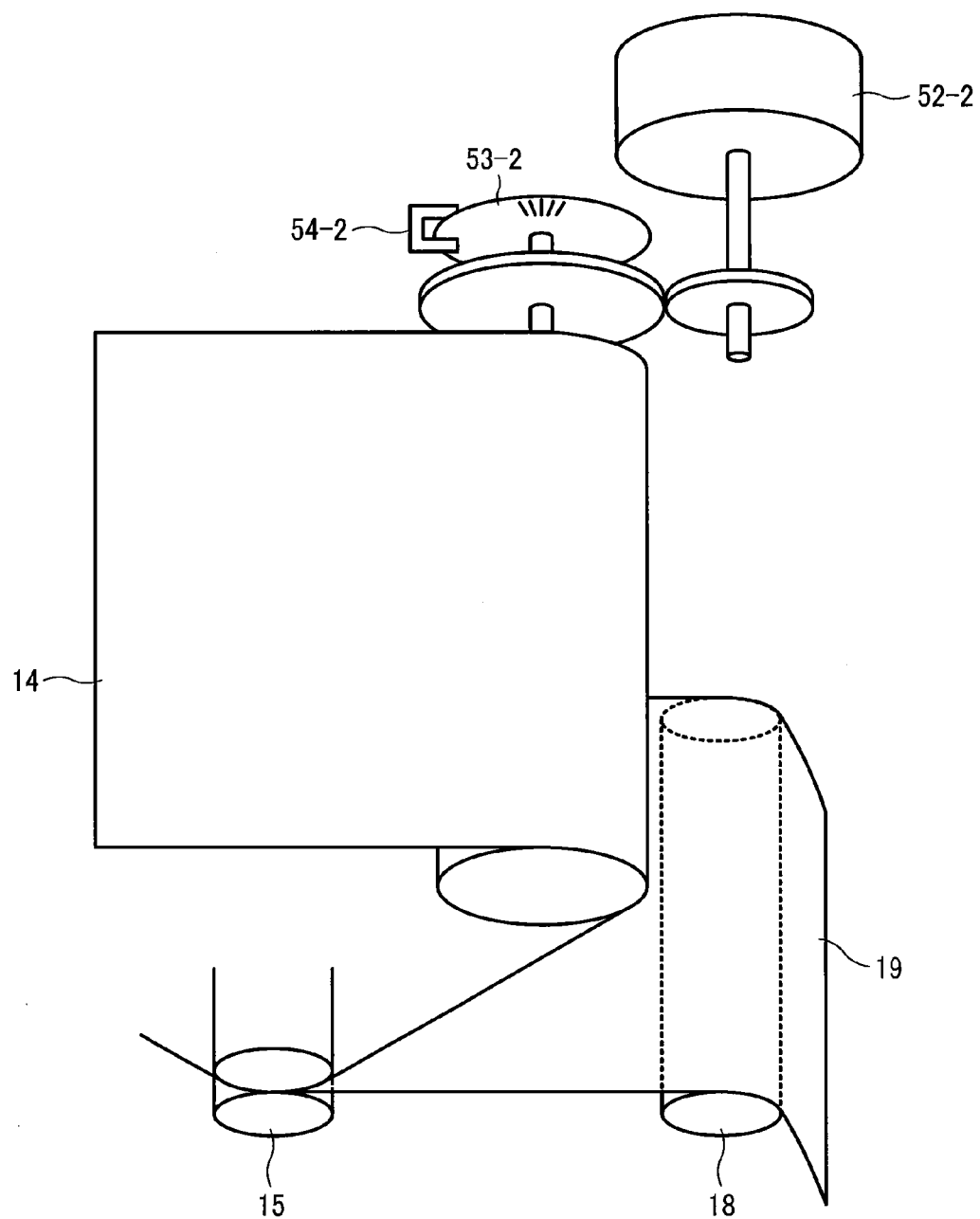
FIG. 13 is a diagram showing an example of a configuration of parts around a drive motor mechanism of an intermediate transfer belt.

FIG. 13 is a diagram showing an example of a configuration of parts around the drive motor mechanism of the intermediate transfer belt 14. As shown in FIG. 13, around the drive motor mechanism of the intermediate transfer belt 14, the intermediate transfer belt 14 and the secondary transfer roller 15 as well as a motor 52-2 for driving the intermediate transfer belt 14, a code wheel 53-2, and a pulse generating unit 54-2 are arranged.

Even in the case of the configuration as shown in FIG. 13, by using the components shown in FIG. 2, occurrence of failure of not only the intermediate transfer belt 14 to which the code wheel 53-2 and the pulse generating unit 54-2 are attached but also the secondary transfer roller 15 can be detected.

Namely, for example, by replacing the photosensitive drum 51, the motor 52, the code wheel 53, the pulse generating unit 54, and the developing roller 71 in FIG. 2 (and FIG. 5) with the intermediate transfer belt 14, the motor 52-2, the code wheel 53-2, the pulse generating unit 54-2, and the secondary transfer roller 15 in FIG. 13, occurrence of failure of the intermediate transfer belt 14 and the secondary transfer roller 15 can be detected by the same method as the first embodiment.

Furthermore, occurrence of failure of the paper conveying roller 18 can also be detected. Namely, for example, when the paper conveying roller 18 is in failure, force of the paper conveying roller 18 to convey transfer paper 19 toward the secondary transfer roller 15 may be increased. In such a case, this force affects the rotating speed of the secondary transfer roller 15, and also acts on the rotating speed of the intermediate transfer belt 14. Therefore, occurrence of failure of the paper conveying roller 18 can be detected in the same manner as in the case where the secondary transfer roller 15 is in failure.

Incidentally, parts of which the failure can be detected other than the part to which the pulse generating unit is attached are not limited to those illustrated in the first and second embodiments. Any part can be an object of failure detection as long as the part, for example, abuts on the part to which the pulse generating unit is attached or has contact with the part to which the pulse generating unit is attached via another object thereby affecting a pulse signal generated by the pulse generating unit. For example, when wear of a blade for removing developer from the intermediate transfer belt 14 by abutting on the intermediate transfer belt 14 affects a pulse signal, the blade can be an object of malfunction detection.

According to the present invention, a malfunction detecting function can be achieved in a simpler configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device including a first motor, the electronic device comprising:
   a first movable body that is driven to move by the first motor;
   a detecting unit that detects a signal according to rotation of the first motor or movement of the first movable body;
   a second movable body which is driven to move by a second motor, the second movable body abutting on the first movable body or having contact with the first movable body via another object, or electrically or magnetically acting on the first movable body; and
   a determining unit configured to determine presence of malfunction of the first motor or the first movable body on the basis of an analysis result of a predetermined first frequency from among frequencies of the signal, and configured to determine presence of malfunction of the second motor or the second movable body on the basis of an analysis result of a predetermined second frequency from among the frequencies of the signal, according to rotation of the first motor or movement of the first movable body.

2. The electronic device according to claim 1, wherein the second movable body is a rotating body which is driven to rotate by the second motor.

3. The electronic device according to claim 1, wherein
   the first movable body carries developer to be transferred onto transfer paper, and
   the second movable body removes the developer carried on the first movable body by abutting on the first movable body.

4. The electronic device according to claim 1, further comprising a notifying unit that notices a result of the malfunction determination by the determining unit.

5. The electronic device according to claim 1, wherein the determining unit determines signs of malfunction of the first movable body and the second movable body on the basis of a first frequency peak variation rate and a second frequency peak variation rate that are obtained from an analysis of the signal.

6. A malfunction determining method performed by an electronic device including a first motor, a first movable body driven to move by the first motor, a second motor, a second movable body driven to move by the second motor, the second movable body abutting on the first movable body or having contact with the first movable body via another object, or electrically or magnetically acting on the first movable body, the malfunction determining method comprising:
   by a detecting unit, determining presence of malfunction of the first motor or the first movable body on the basis of an analysis result of a predetermined first frequency from among frequencies of the signal; and
   by the same or a different detecting unit, determining presence of malfunction of the second motor or the second movable body on the basis of a predetermined second frequency from among the frequencies of the signal.

7. A computer program product comprising a non-transitory computer-medium containing instructions that, when executed by a computer, cause the computer to perform malfunction determining method, the malfunction determining method comprising:
   by a detecting unit, determining presence of malfunction of a first motor or a first movable body on the basis of an analysis result of a predetermined first frequency from among frequencies of detected signal; and
   by the same or a different detecting unit, determining presence of malfunction of a second motor or a second movable body driven by the second motor on the basis of an analysis result of a predetermined second frequency from among the frequencies of the detected signal.

* * * * *